Inventor
G. A. Lee

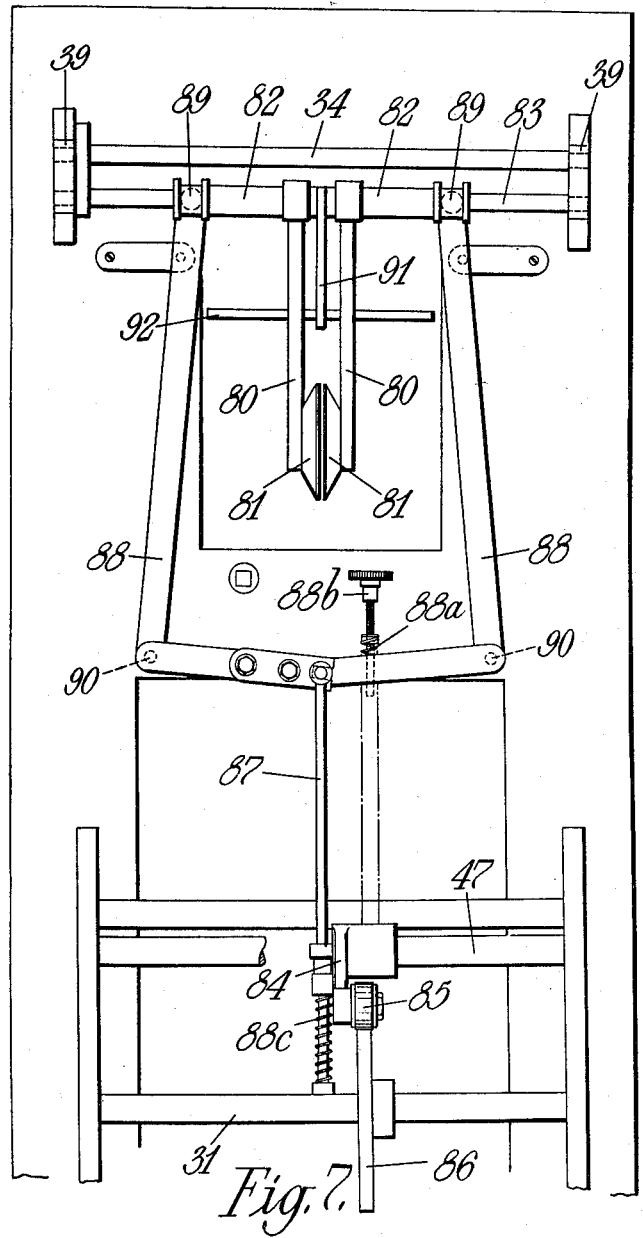

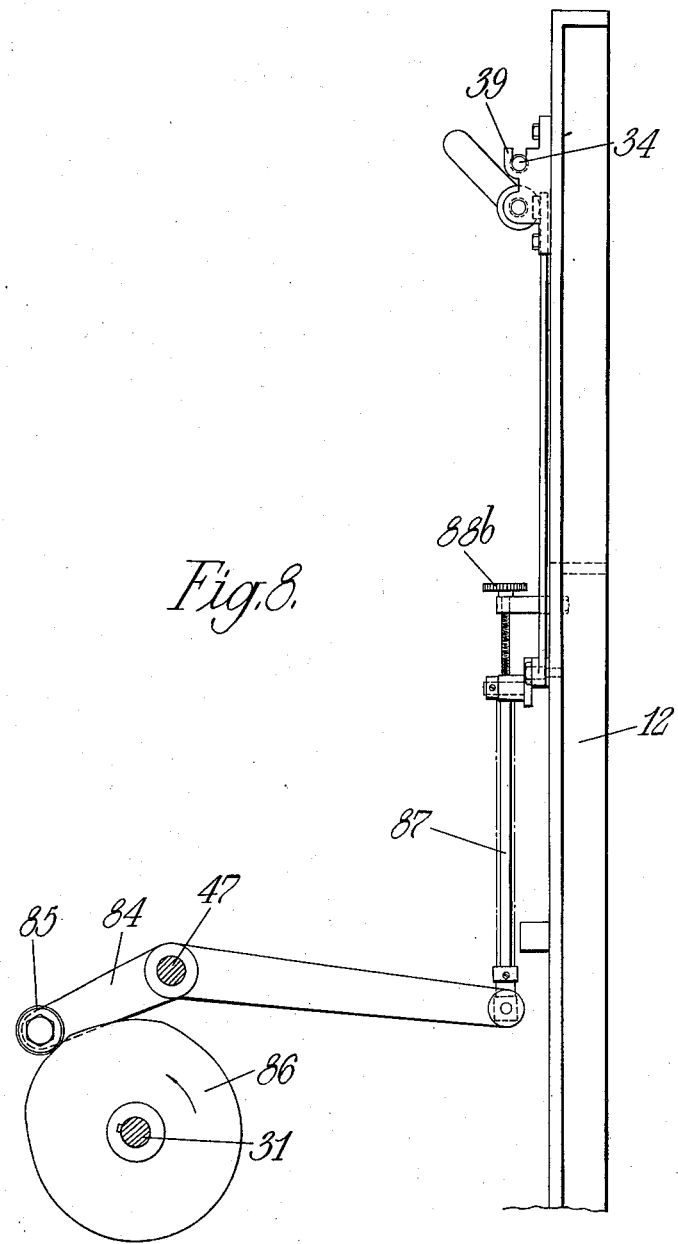

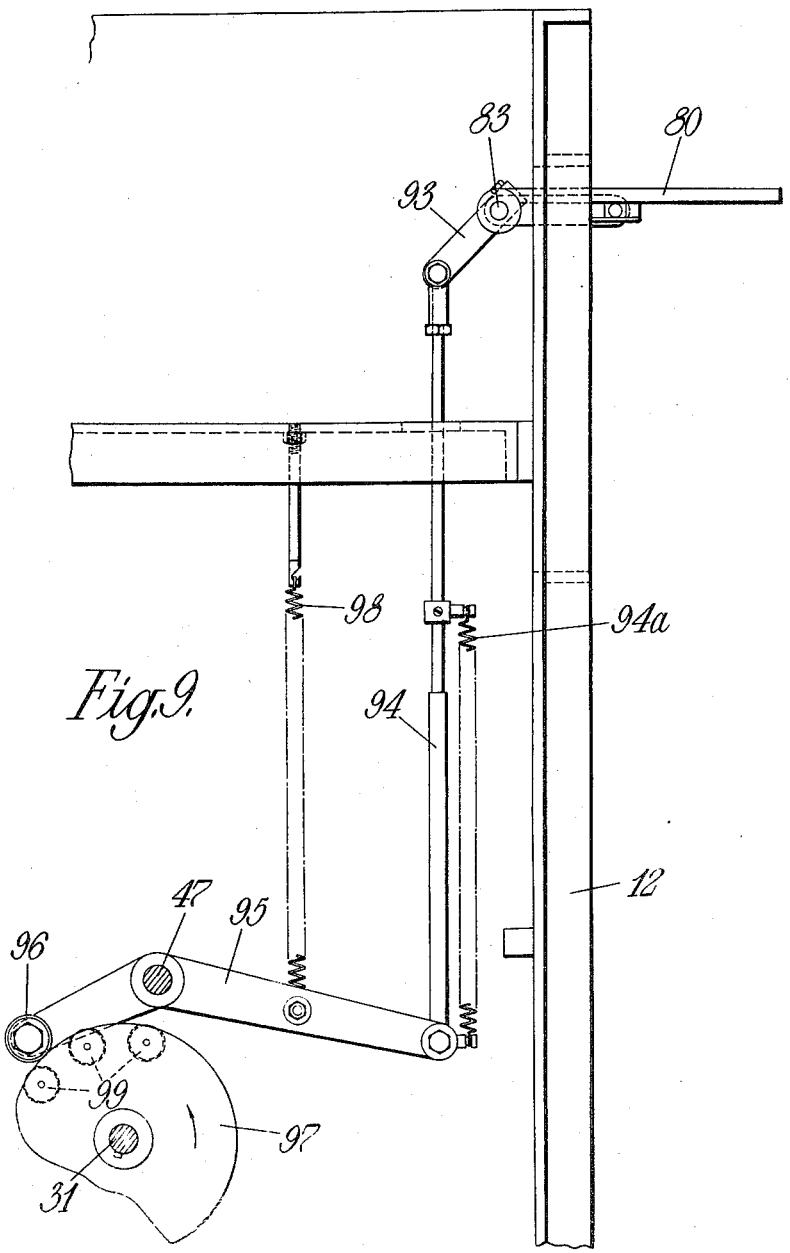

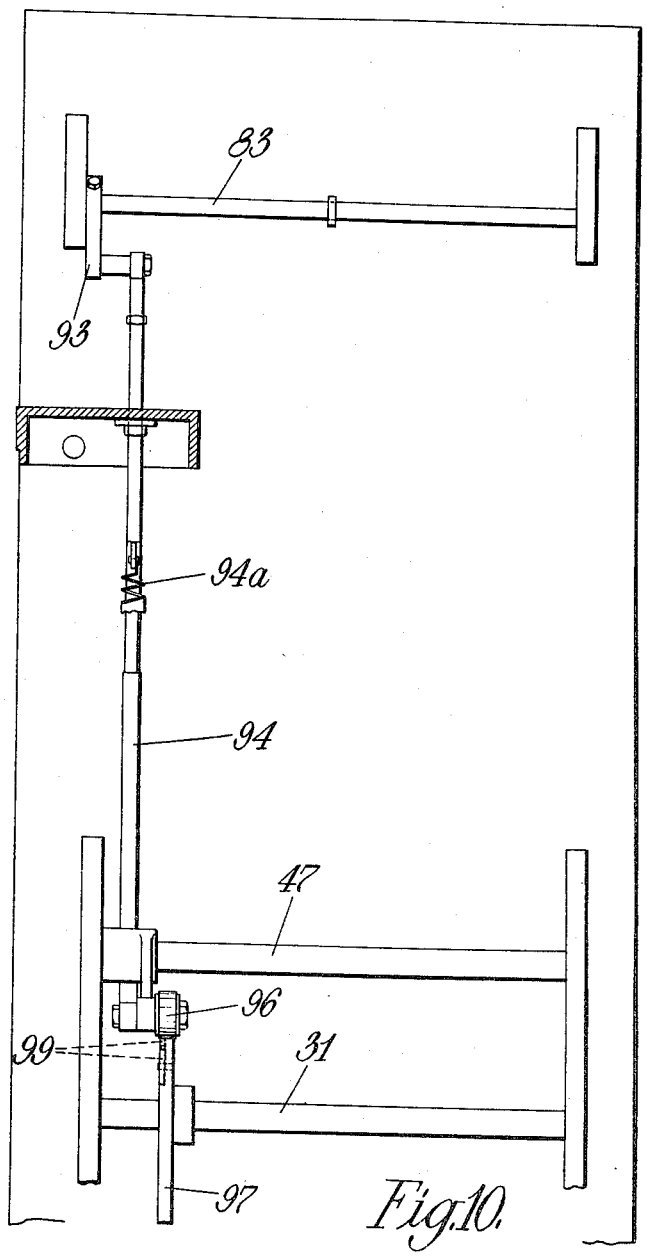

United States Patent Office 2,926,475
Patented Mar. 1, 1960

2,926,475

APPARATUS FOR FEEDING AND PRESENTING BAGS FOR PACKETING OR FILLING

George Arthur Lee, Cuffley, England, assignor to Autopack Limited, Birmingham, England Application April 19, 1957, Serial No. 653,842

13 Claim. (Cl. 53—386)

This invention relates to apparatus for feeding and presenting bags for filling of the kind in which bags are withdrawn from a supply or magazine of bags in flat condition and are fed or presented to a packeting or filling device with the bag or bag mouth in opened condition.

Mechanism hitherto employed for the above purpose is not always satisfactory for certain classes of bags and particular difficulties are encountered in the handling of bags formed from synthetic plastic and similar materials and in particular bags formed from polyethylene.

It is accordingly an object of the invention to provide improved means for the above purpose which are more satisfactory and reliable in operation, particularly with bags of the character previously indicated, although the invention is not restricted in its use to bags formed from any particular class of material.

A further object of the invention is to provide improved means for the above purpose which is particularly adapted for use with automatic machines for packeting or filling bags with measured or weighed quantities of materials.

According to the invention there is provided apparatus for feeding and presenting bags for filling of the kind referred to comprising, a magazine adapted to support a stack of bags in flat condition, a suction device for displacing the closed end or base of the lowermost bag from the stack, hollow separator blade means which is inserted between the partially displaced bag and the remainder of the stack for removing said bag from the magazine and relatively movable suction devices, one of which is carried by or associated with said separator blade means, for opening the mouth of the bag.

The invention also comprises means according to the preceding paragraph in which the magazine is arranged to support the stacked bags in substantially horizontal or slightly inclined position to horizontal and a pivotally mounted platform is provided which can be moved towards and away from the magazine, said platform carrying at its rear end the suction device for displacing the closed end or base of the lowermost bag in the stack and at its front end the suction device is adapted to displace one side of the bag mouth in conjunction with the action of the suction device associated with the separator blade means for opening the bag mouth. Preferably a carrier is provided for guiding the separator blade means in its motion between the lowermost bag and the remainder of the stack and such carrier has a pivotal mounting common to the pivotal mounting of the aforesaid movable platform. The movements necessary to perform the operations of withdrawing the bag from the magazine and opening the mouth thereof are preferably effected by cams on a camshaft, the suction devices being controlled by valve means operated in the required synchronism with such movements.

In accordance with a further feature of the invention, means is provided for transferring and presenting the partially opened bag for packeting or filling, comprising a pair of members movable from a substantially closed position, in which they can be introduced into the partially open bag mouth to an open position in which the bag mouth is fully opened and the bag is held or gripped thereby, the said members being movably or pivotally supported to effect the transfer of the opened bag to a vertical filling position.

According to a further feature of the invention the said bag opening and gripping members are mounted for parallel movement to open and grip the bag and are adapted to be swung about a horizontal axis to present the bag to a filling device. In a convenient construction for this purpose a pair of separating and gripping blades extend laterally from supports which are slidable towards and away from each other on a horizontal spindle or rocker shaft.

The rocker shaft is preferably provided with means on which said blades are slidable so that partial rotation of said rocker shaft causes said blades to be swung to a horizontal position to present the bag to the filling device. The partial rotation of the rocker shaft and the movement of the blades is preferably effected by further cams on the camshaft.

In the accompanying drawings:

Figure 7 is a front elevation of the bag presenting mechanism viewed from the rear of the apparatus and showing the mechanism for moving the pick-up arms apart.

Figure 8 is a side elevation of the mechanism shown in Figure 7.

Figure 9 is a front elevation of the bag presenting mechanism viewed from the rear of the apparatus and showing the mechanism for moving the pick-up arms from a vertical to a horizontal position.

Figure 10 is a side elevation of the mechanism shown in Figure 9.

Figure 1:
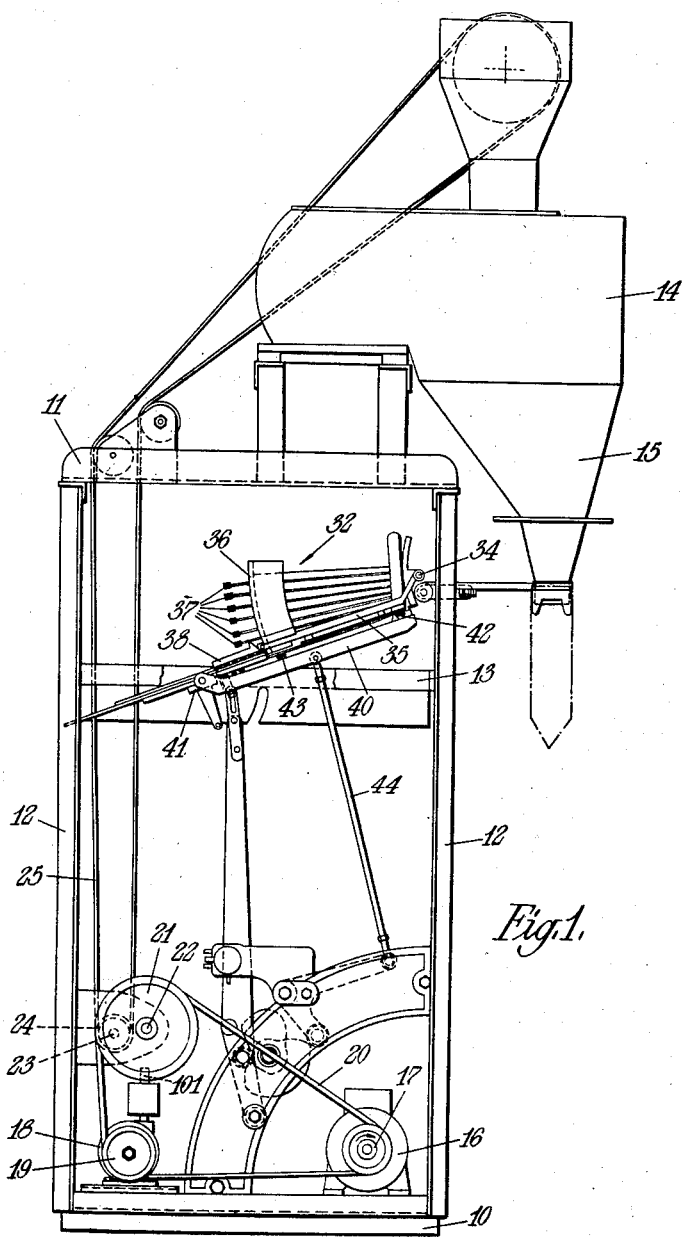
Figure 1 is a side elevation of an apparatus for feeding and presenting bags for filling according to the present invention.
Figure 2:
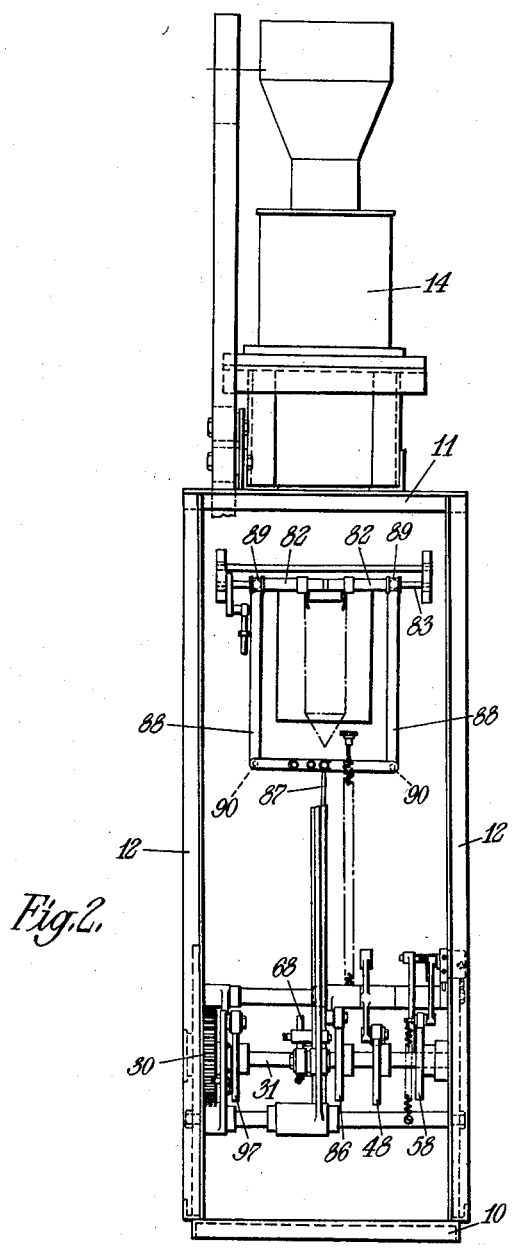
Figure 2 is a front elevation of the apparatus shown in Figure 1, with parts omitted and viewed from the rear of the apparatus.

In carrying the invention into effect according to one convenient mode a bag filling machine is provided having a base member 10 and a top member 11 interconnected by vertical side members 12. A horizontal platform 13 is connected to the side members 12 intermediate the base and top members. A conventional weighing machine 14 and hopper 15 are mounted on the top member 11 of the machine.

An electric motor 16 having a pulley 17 and a suction pump 18 having a pulley 19 are mounted on the base member 10. The pulleys 17 and 19 are connected by an endless belt 20 to a driven pulley 21 keyed to the end of a cross-shaft 22 which extends transversely of the machine. The driven pulley 21 is connected by reduction gearing (not shown) to a further cross-shaft 23 having a pulley 24 which provides a drive to the weighing machine 14 by an endless belt 25. Connected to the opposite end of the cross-shaft 23 and on the opposite side of the machine is a pulley 26 connected by an endless belt 27 to the drum 28 of a brake mechanism which provides an intermittent drive as will be later described. The drum 28 drives a small gear 29 which meshes with and drives a larger gear 30 mounted on a camshaft 31.

A bag magazine 32 arranged to support stacked bags 33 in substantially horizontal or inclined position is pivotally mounted on a shaft 34 at one end and adjustably supported on the platform 13 at the other end. The magazine has spaced parallel side members 35 connected together by end members (not shown) and the base of the magazine is open to permit withdrawal of bags, but has a ledge on each side member adapted to support the stack of bags 33. Each side member 35 is provided with a vertical arcuate wing member 36 for maintaining alignment of the stack of bags.

During loading of the bags 33 into the magazine 32, separators 37 are inserted at spaced intervals between the bags, as it has been found that the use of separators substantially increases the number of bags which can be stacked. During operation of the machine the separators 37 are removed by an ejector 38 as will be hereinafter described. The magazine is mounted on the machine by spaced bearings 39 and is easily removed together with the shaft 34 for loading away from the machine.

A tilting structure or platform 40 is pivotally mounted below the magazine 32 and carries front and rear suction devices 42 and 43 respectively, the rear one 43 which is movable relatively to the tilting platform 40 is located to act on the closed end or base of the lowermost bag to displace it from the stack of bags in the magazine, and the front one 42 is located to act on the underside of the mouth end of said bag as will be described. The end of the platform 40 adjacent the rear suction device 43 is pivotally mounted on a shaft 41 which is positioned on the horizontal platform 13 intermediate the vertical frame members 12 and which extends transversely of the machine and parallel to the camshaft 31. The platform 40 is operatively connected by means of a rod 44 to one end of a pivoted bell-crank lever 45 having a roller 46 on the other end thereof. The bell-crank lever 45 is pivotally mounted on a shaft 47 (hereinafter termed the lever pivot) which extends transversely of the frame, parallel to and above the camshaft 31. The roller 46 engages a cam 48 on the camshaft 31 and the arrangement is such that rotation of the cam 48 raises and lowers the front end of the platform 40 about the shaft 41 as will be hereinafter described. A spring 49a is provided which counter-balances the weight of the platform 40.

The rear suction devices 43 is raised into engagement with the base of the lowermost bag in the stack by means of a Bowden control. The ends 49 and 50 of the inner cable 51 of the control are connected to a lever 52 and the tilting platform 40 respectively. The ends 53 and 54 of the outer cable are in engagement with a fixed abutment 55 and a sliding block 56 on which the rear suction device is mounted.

The lever 52 is mounted on the pivot shaft 47 and the end of the lever 52 is adapted to be engaged by a roller 57 mounted on a cam 58 on the camshaft 31. The lever 52 is returned against a stop (not shown) adjacent the abutment 55 by a return spring 59.

Rotation of the cam 58 causes the roller 57 to engage and move the end of the lever 52 which exerts a pull on the inner cable 51. This movement causes the outer cable to raise the block 56 and suction device 43 upwardly. Further rotation of the cam 58 allows a return spring 60 to lower the block 56.

The cam 58 is also operatively associated with a suction valve as will be described hereinafter.

Separation of the lowermost bag from the magazine after it has been displaced is effected by inserting a hollow separator blade 61 between the closed end or base of the penultimate and lowermost bags, the blade 61 being caused to travel forwardly until its front end 61a is adjacent to the mouth ends of the bags. This movement of the separator blade 61 is guided by a carrier 62 having a slot in which the blade 61 slides. The carrier 62 comprises a rectangular plate pivoted intermediate its ends on the pivot shaft 41 of the tilting platform 40 to lie above the latter. When the separator blade 61 is in its forward position in the carrier 62, as will be described, a suction slot on the front end 61a thereof lies on the upper side of the separated bag mouth, opposite the suction device 42 on the tilting platform 40 which holds the underside of the mouth of the separated bag. Downward movement of the forward portion of the carrier 62 is limited by an adjustable stop 63 so that when the tilting platform 40 is lowered, its forward end and associated suction device 42 are withdrawn or spaced from the forward end of the carrier 62 before the latter comes against its stop.

The separator blade 61 is mounted in a guide slot in the carrier 62 and its rear end is operatively connected by means of a link 64 to one end of a lever 65 pivotally mounted on a further pivot shaft 66. The lever has a roller 67 mounted thereon intermediate its ends which engages a cam 68 on the camshaft 31, the arrangement being such that rotation of the cam 68 slides the separator blade 61 rearwardly in the carrier and a spring 69 returns the blade forwardly.

The ejector 38 previously referred to, is mounted on and moves with the separator blade 61. As the bags are withdrawn from the stack during operation, the separators 37 move downwardly in the magazine until a hook portion 70 on the ejector 38 engages and removes them rearwardly from the machine as shown at 71a.

The machine so far described concerns the separation of a single bag from the magazine and the initial opening of the mouth of the bag. The operation will now be described.

Rotation of the camshaft 31 swings the tilting platform 40 upwardly about its pivot 41. During its upward movement, a projection or screw 72a mounted on the tilting platform 40 engages the blade carrier 62 whereby the latter is also swung upwardly about the pivot 41 by the tilting platform 40. At the end of the lift, the carrier 62 is at approximately the same angle as the bag magazine 32 in preparation for displacement of the lowermost bag in the stack.

Figure 4:
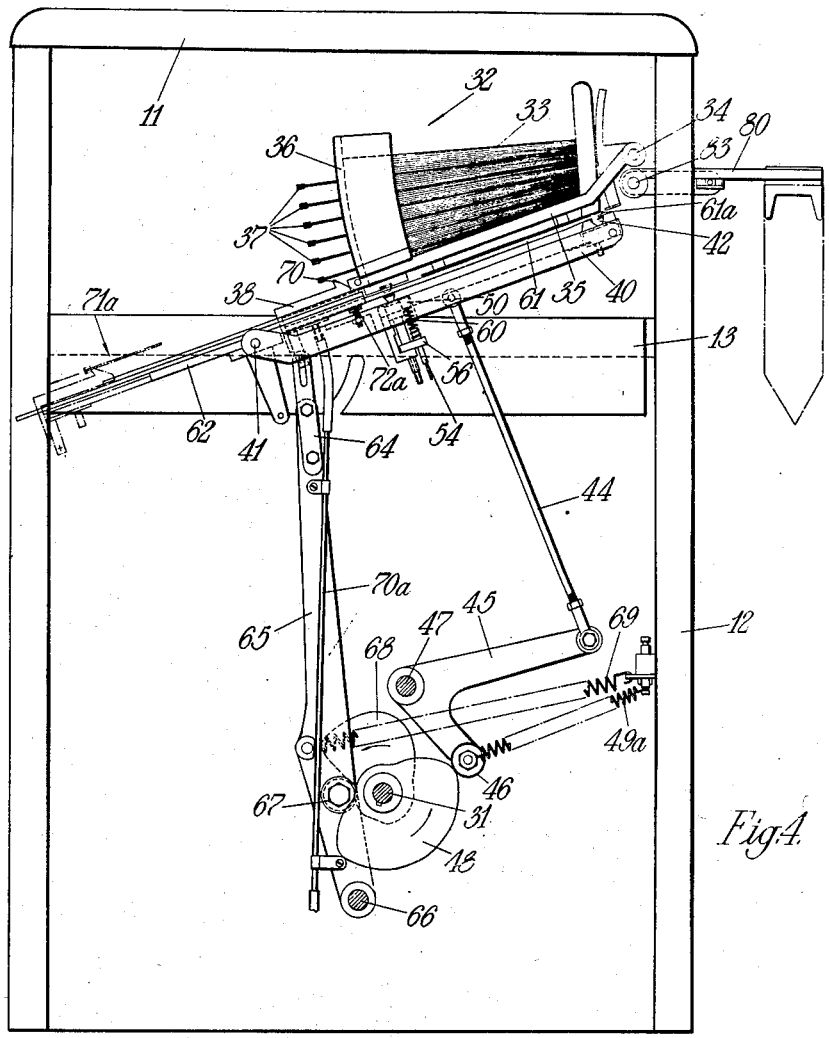
Figure 4 is a detailed side elevation of the apparatus, on a larger scale and similar to Figure 1.
Figure 5:
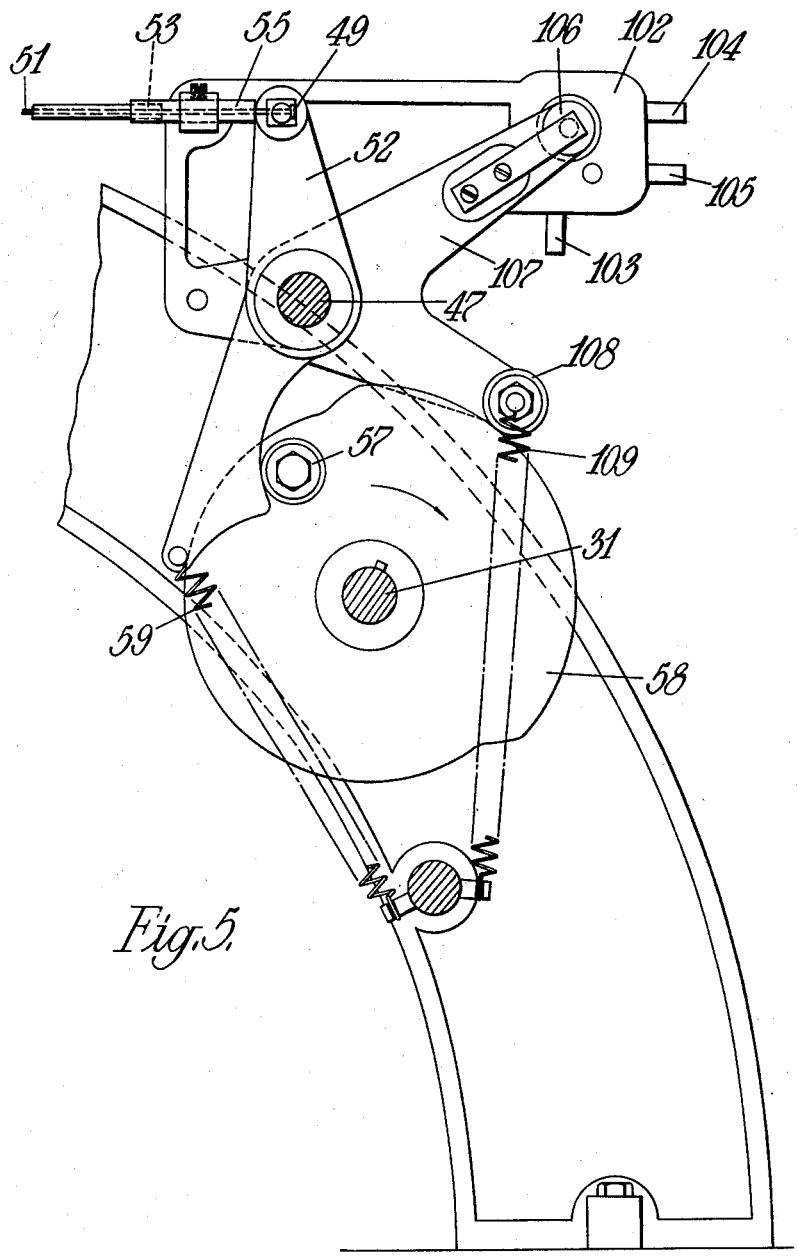
Figure 5 is a side elevation of the cam for raising the rear suction device and controlling the suction valve.
Figure 6:
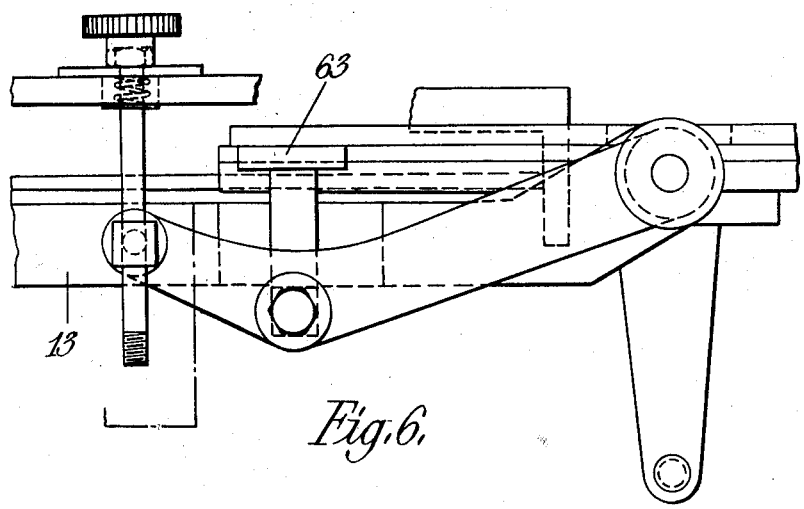
Figure 6 is a side elevation of the stop for the blade carrier.
Figure 11:
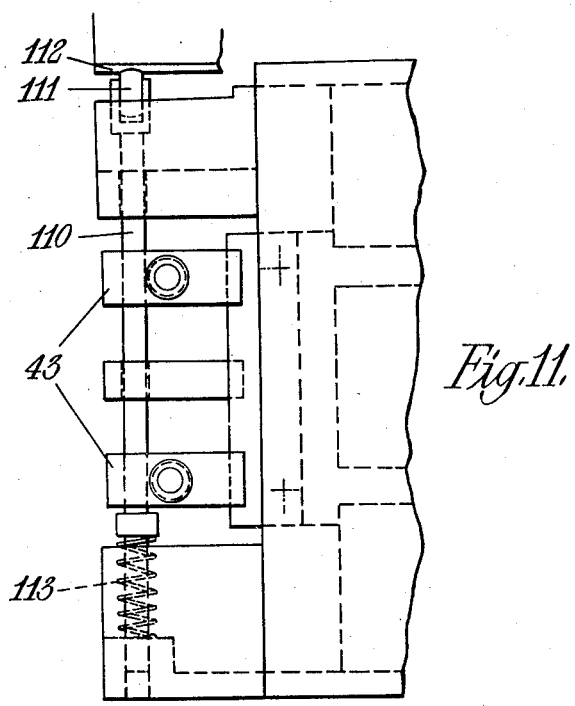
Figure 11 is a plan view of the forward portion of the tilting platform showing the front suction device thereon.

Rotation of the cam 68 associated with the separator blade 61 withdraws the latter rearwardly in the carrier 62 to the position shown in dotted lines in Figure 4, and rotation of the cam 58 associated with the rear suction device 43 raises it upwardly into engagement with the base of the lowermost bag in the magazine and suction is applied via the conduit 70a to the device to hold the base of the lowermost bag in the stack against said device. Subsequent downward movement of the rear suction device 43 causes the base of the said bag to be displaced away from the supporting ledges of the magazine 32 whereby a space is afforded between the said bag end and the next bag in the stack. Further rotation of the separator blade cam 68 allows the return spring 69 to act on the lever 65 connected to the blade 61 and causes the latter to be moved forwardly so that its forward end 61a enters the space between the bag bases and travels the full length of the stack. This movement of the blade 61 has the effect of completely separating the bag from the magazine 32. Further rotation of the cam 48 controlling the tilting platform 40 now allows the forward end of the tilting platform 40 to be lowered, and the forward part of the carrier 62 with the separator blade 61 therein follows the platform until the carrier is arrested by the stop 63 referred to previously. The suction device on the forward end of separator blade holds the upper side of the mouth of the bag and the front suction device 42 on the tilting platform 40 holds the lower side of the mouth of the bag and thus, as the tilting platform 40 is lowered further against its stop (not shown) the mouth of the bag is opened ready to receive pick-up arms 80 which are adapted to present the open bag to the mouth of the hopper.

The brake mechanism previously referred to, is brought into operation to prevent rotation of the camshaft 31 during the measuring or weighing of the material and comprises a solenoid 71 connected by a rod 71b to a lever 72 pivotally mounted at 73. The brake lining 74 which is positioned within the drum 28, is mounted on a support 74a for pivotal movement about a pin 75 toward and away from the drum 28 and the support 74a is also pivotally connected to the lever 72 by a rod 75a. A pivot pin 76 connects the rod 75a and lever 72 together and a protruding portion thereof is located in a recess on a lever 77 during the separation and presentation of each bag. The drum 28 is mounted on a support 28a which is movable about the camshaft 31.

The lever 77 is provided with a member 77a which is adapted to be engaged by a striker member 31a mounted on the camshaft 31. A spring 78 connected between the lever 72 and the lever 77 is positioned to urge the lever 72 downwardly and to urge the lever 77 in a clockwise direction about its pivot 79.

Figure 3:
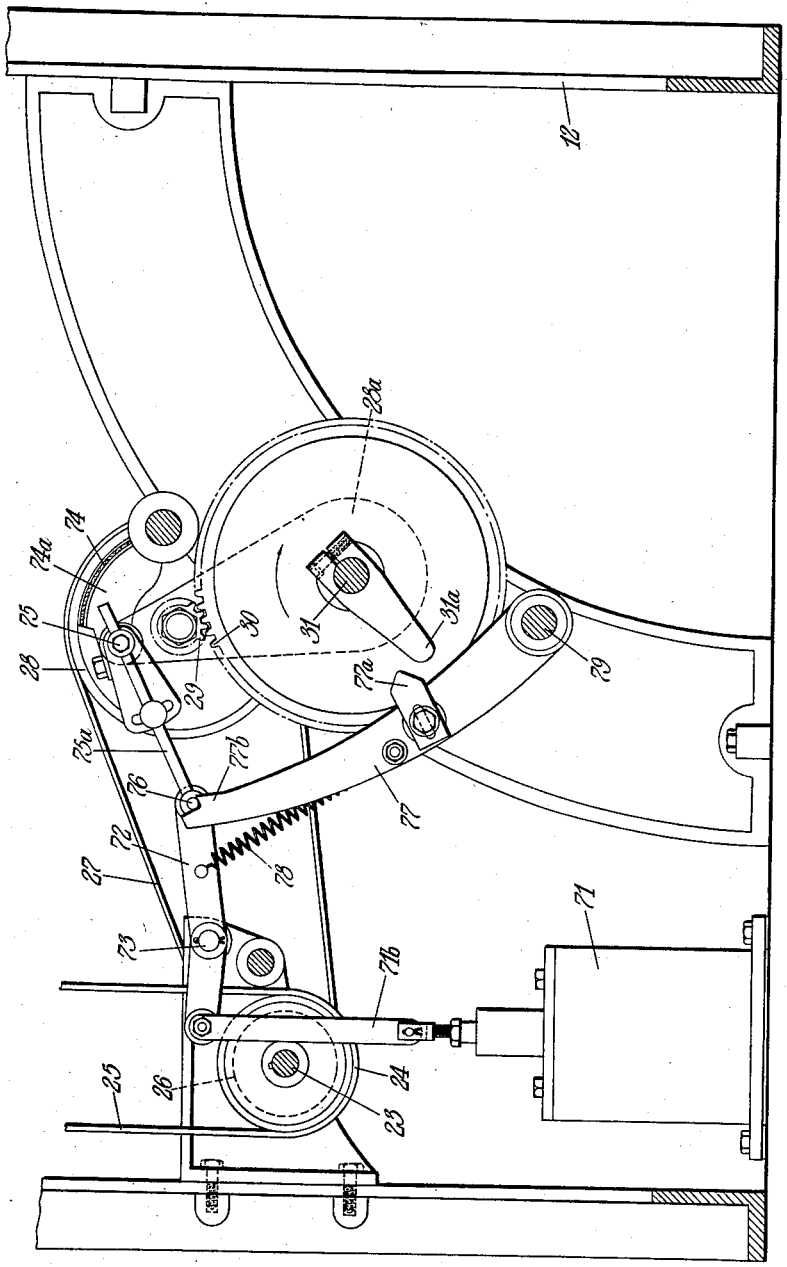
Figure 3 is a side elevation of the apparatus showing the brake mechanism for preventing rotation of the camshaft.

In operation, as the machine terminates the separation and presentation operations, the striker member 31a engages the member 77a and displaces the lever 77 leftwards (Figure 3) so that the pin 76 is clear of the recess in the lever 77. The spring 78 moves the lever 72 in a clockwise direction about its pivot 73, which results in the location of the pin 76 against the surface 77b of the lever 77.

The downward movement of the pin 76 and associated rod 75a tilts the support 74a about its pivot 75 in an anti-clockwise direction and brings the lining 74 into engagement with the drum 28 to brake same.

In addition, this movement results in a slight leftwards displacement of the pulley support 28a about the camshaft 31 which moves the pivot 75 nearer to the pivot 73 and so releases the tension of the endless belt 27 which is now driven freely about the braked drum 28.

An auxiliary manual switch (not shown) is provided on the machine for closing the solenoid circuit to start a cycle of operations. The lever 72 is turned anti-clockwise and latched by lever 77 for a time cycle which is terminated by the striker 31a. A bag is now presented for filling and the commencement of the next cycle is effected by a switch in the solenoid circuit mounted and operated by the weighing or filling unit (not shown).

Bag presentation means are provided comprising a pair of spaced parallel pick-up arms 80 each arm having a bag-engaging blade 81 extending laterally from the end thereof. The opposite end of each arm is attached to a hollow sleeve 82 slidably mounted on a rocker shaft 83 which extends between the front vertical frame members, the rocker shaft 83 being positioned below the magazine support 34.

The pick-up arms 80 are moved apart by means of a bell-crank lever 84 pivoted on the aforesaid lever pivot 47. One end of said bell-crank lever 84 has a roller 85 mounted thereof which engages a cam 86 on the camshaft 31 and the opposite end of the lever 84 is connected to a vertical connecting rod 87. The opposite end of the connecting rod engages adjacent ends of a pair of bell-crank levers 88 pivoted on a front frame member. The rod 87 is moved upwardly by a return spring 88a which is adjustable by means of a screwed adjustment control 88b. The opposite end of each bell-crank lever 88 is operatively connected to one of the sleeves 82 by means of a trunnion bearing 89. Thus, as the cam 86 rotates, the connecting rod 87 is moved upwardly by the spring 88a, swinging the bell-crank levers 88 about the pivots 90. The upper ends of the bell-crank levers 88 are thus moved apart, each lever taking with it its respective sleeve 82 and pick-up arm 80. The spring 88c acts as a safety device should an overload occur. It will be appreciated that when the bag-engaging members 81 have been positioned inside the partially open mouth of the bag, outward displacement of the pick-up arms 80 causes the bag to be securely gripped by the said members 81 ready for swinging movement which presents the open mouth of the bag around the mouth of the hopper. The rocker shaft 83 is provided intermediate its ends with an integral outrigger member which comprises a rod 91 fixed normal to the shaft 83 and an arm-engaging beam 92 connected intermediate its ends to the outer end of the said rod 91 so that said beam 92 is parallel and in spaced relation to the rocker shaft 83. Each pick-up arm 80 slidably rests on said beam 92. The rocker shaft 83 is operated by means of a link 93 fixed to the end thereof. The opposite end of the link 93 is connected by means of a rod 94 to the end of a bell-crank lever 95 pivoted on the aforesaid lever pivot 47. The rod 94 comprises inner and outer members, the inner being freely slidable within the outer. The two members are connected by a spring 94a so that they normally act as a unitary rod, but are capable of moving relatively to one another to act as a safety device should an overload occur. The opposite end of said bell-crank lever 95 is provided with a roller 96 which engages a cam 97 on the camshaft 31 and the arrangement is such that as the cam 97 rotates the bell-crank lever 95 pulls the rod 94 and link 93 downwardly and causes the rocker shaft 83 to be rotated through an angle of approximately 90°. It will be appreciated that this rotation of the rocker shaft 83 also causes the outrigger member and pick-up arms to swing through 90° i.e. from a vertical to a horizontal position. Thus by this movement the mouth of the bag is positioned around the mouth of the hopper.

Further rotation of the cam 97 allows the spring 98 to move the lever 95 upwardly and so return the pick-up arms 80 to the vertical position. The cam 97 is provided with a series of circular inserts 99 which protrude slightly above the surface of the cam 97 so that when the roller 96 moves over these inserts 99 the pick-up arms 80 are given a rapid reciprocatory motion which has the effect of compacting the material in the filled bag.

The cam 86 which moves the pick-up arms apart is also provided with a portion which, on further rotation of the cam on completion of the filling operation, causes the bag-engaging members to be moved towards each other a distance sufficient to release the bag which falls, and is received by suitable means e.g. a conveyor by which it is removed, after which the sequence of operations is repeated.

The suction pump 18 mounted on the base of the machine has the main suction conduit 101 thereof connected to a fixed valve plate 102, the latter being provided with three connectors 103, 104 and 105 which are connected respectively to the hollow separator blade and the front and the rear suction devices on the tilting platform. The suction devices are connected to the main suction conduit in the correct sequence by means of a movable valve member 106 mounted on the end of a bell-crank lever 107. The lever 107 is pivoted on the aforesaid lever pivot 47 and has a roller 108 mounted on the other end thereof which is held in contact with the cam 58 by means of a spring 109. It will be appreciated that rotation of the cam 58 moves the lever 107 which in turn controls the movement of the valve member 106.

A mercury switch (not shown) is mounted above one of the pick-up arms 80, so that should the pick-up arms, for any reason, fail to engage the mouth of a bag, the pick-up arms move outwardly to their limit of travel and when they are swung upwardly, one of the arms fails to engage the mercury switch mechanism and thus does not complete a circuit to the associated weighing or measuring machine. This prevents the weighing or measuring machine discharging and thereby stops the bag feeding cycle until the cause of the failure to pick-up a bag is corrected.

It is found that with bags which are formed by cutting from the lengths of tubular material of a thermoplastic character, such as polyethylene, there is a tendency for the sides of the bag mouths to adhere, and this may interfere with the opening of the mouths by the mechanism previously described. To overcome this difficulty means are provided for effecting relative lateral displacement of the opposite sides of the bag mouth portions before an attempt is made to separate these portions. This is effected by imparting to the front suction device 42 a small lateral displacement relative to the separator blade 60 whilst the respective suction devices are operative on opposite sides of the bag mouth. The required lateral displacement is effected by a rod 110 slidably mounted in the front portion of the tilting platform 40 and having connected thereto the front suction device 42. The rod 110 has a roller 111 mounted on the end thereof which engages a cam portion or inclined surface 112 on the frame of the machine. It will be appreciated that this engagement imparts a lateral movement to the front suction device 42 which provides the required displacement of the opposite sides of the bag mouth. A return spring 113 returns the rod and front suction device to the central position.

I claim:

1. Apparatus for feeding and presenting bags for filling of the kind referred to comprising a magazine adapted to support a stack of bags in flat condition, a suction device for displacing the closed end or base of the lowermost bag from the stack, hollow separator blade means which is inserted between the partially displaced bag and the remainder of the stack for removing said bag from the magazine and relatively movable suction devices, one of which is associated with said separator blade means, for opening the mouth of the bag.

2. Apparatus as claimed in claim 1, having a pivotally mounted platform which is movable towards and away from the magazine, said platform carrying at its rear end the suction device for displacing the closed end or base of the lowermost bag in the stack and at its front end the suction device which is adapted to displace one side of the bag mouth in conjunction with the action of the suction device associated with the separator blade means for opening the bag mouth.

3. Apparatus as claimed in claim 2, having a carrier for guiding the separator blade means in its motion between the lowermost bag and the remainder of the stack, said carrier having a pivotal mounting common to the pivotal mounting of the movable platform.

4. Apparatus as claimed in claim 2, wherein the rear suction device is movable relatively to the pivotally mounted platform and is raised into engagement with the base of the lowermost bag in the magazine by means of a Bowden control.

5. Apparatus as claimed in claim 2, wherein the front suction device is laterally displaceable relative to the pivotally mounted platform.

6. Apparatus as claimed in claim 5, having a rod with a roller mounted on its end, said front suction device being mounted on said rod so that the lateral displacement is effected by said roller engaging an inclined surface on the side of the apparatus.

7. Apparatus as claimed in claim 1, having a camshaft for effecting the movements necessary to perform the operations of withdrawing and separating the bag from the magazine and opening the mouth thereof and valve means for controlling said suction device operated by one of the cams on the camshaft in the required synchronism with such movements.

8. Apparatus as claimed in claim 1, having separators inserted at spaced intervals between the bags in the magazine which are withdrawn during operation of the apparatus by an ejector mounted on said separator blade means.

9. Apparatus for feeding and presenitng bags for filling of the kind referred to comprising a magazine adapted to support a stack of bags in flat condition, a suction device for displacing the closed end or base of the lowermost bag from the stack, hollow separator blade means which is inserted between the partially displaced bag and the remainder of the stack for removing said bag from the magazine, relatively movable suction devices, one of which is associated with said separator blade means for opening the mouth of the bag and means for transferring and presenting said partially opened bag for filling including a pair of members movable from a substantially closed position in which they can be introduced into the partially open bag mouth, to an open position in which the bag mouth is fully opened and the bag is gripped thereby, said members being movably supported to effect the transfer of the opened bag to a vertical filling position.

10. Apparatus for transferring and presenting a partially opened bag for filling comprising a pair of parallel bag-gripping blades extending laterally from supports which are mounted for movement on a horizontal rocker shaft, said supports when in a substantially vertical position being movable away from each other from a substantially closed position in which the blades are introduced into the partially opened bag mouth to an open position in which the bag mouth is fully opened and gripped by the blades, said supports also being mounted for swinging movement about said rocker shaft to effect the presentation of the opened bag to a filling station when swung from the vertical position.

11. Apparatus as claimed in claim 10, wherein said rocker shaft is provided with means on which said blades are slidable so that partial rotation of said shaft causes said blades to be swung to a horizontal position to present the bag to the filling device.

12. Apparatus as claimed in claim 11, having a camshaft which effects the partial rotation of the rocker shaft and the sliding movement of the blades.

13. Apparatus as claimed in claim 12, wherein the cam for effecting partial rotation of the rocker shaft is provided with means for imparting a rapid reciprocating motion to the blades for compacting the material in the filled bag.

References Cited in the file of this patent

UNITED STATES PATENTS

| | | |
|---|---|---|
| 1,886,376 | Dambacher | Nov. 8, 1932 |
| 1,989,492 | Morey et al. | Jan. 29, 1935 |
| 2,008,826 | Hirschhorn et al. | July 23, 1935 |
| 2,106,463 | Long | Jan. 25, 1938 |
| 2,288,603 | Berch | July 7, 1942 |
| 2,684,191 | Dolman | July 20, 1954 |
| 2,700,496 | Dickey et al. | Jan. 25, 1955 |